April 4, 1950

G. L. JOHNSON ET AL 2,503,202

CONTACTING APPARATUS

Filed March 27, 1946

INVENTORS
GEORGE L. JOHNSON,
JOHN HAPPEL AND
JAMES W. McKEE
BY
ATTORNEY

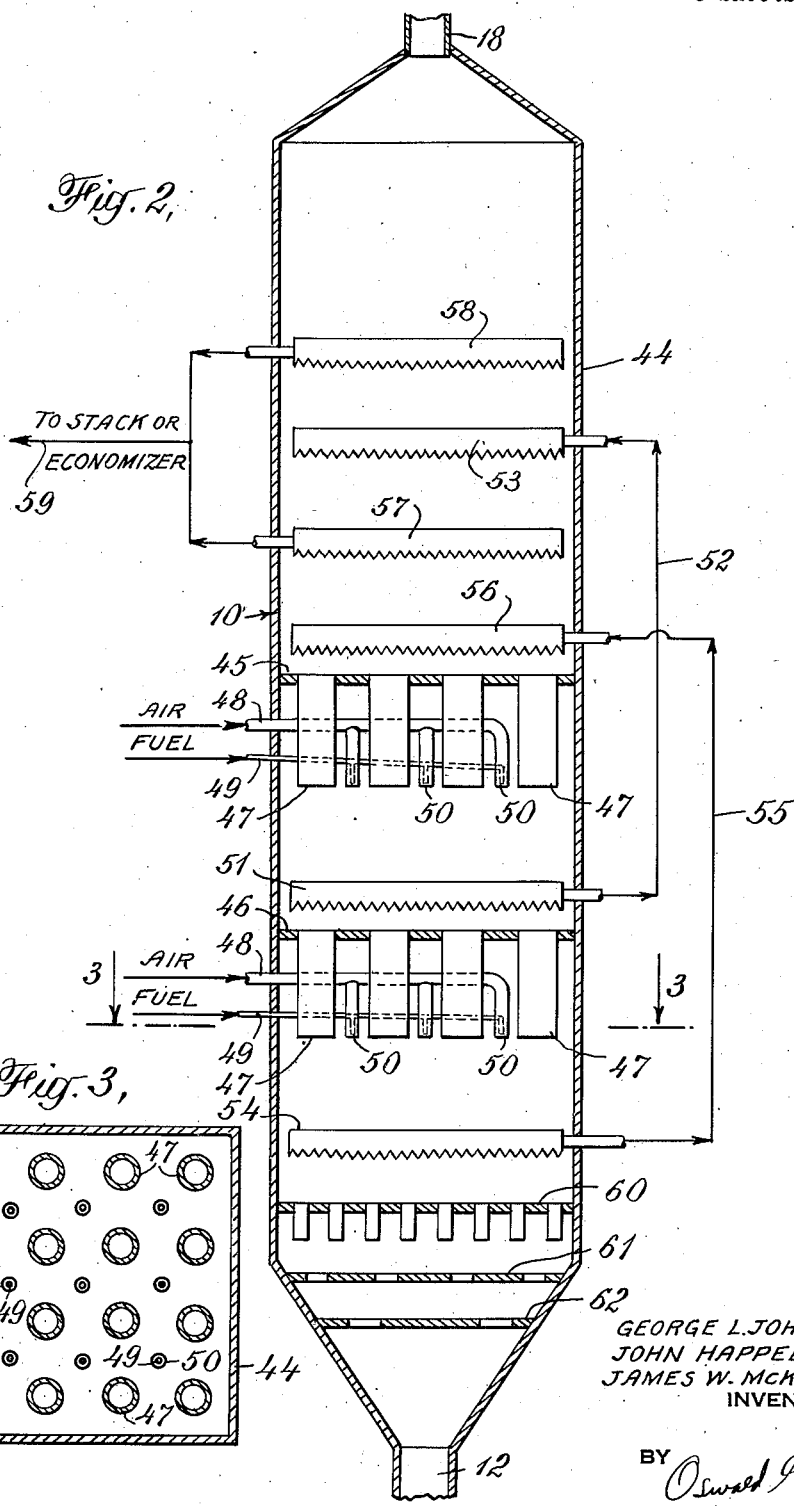

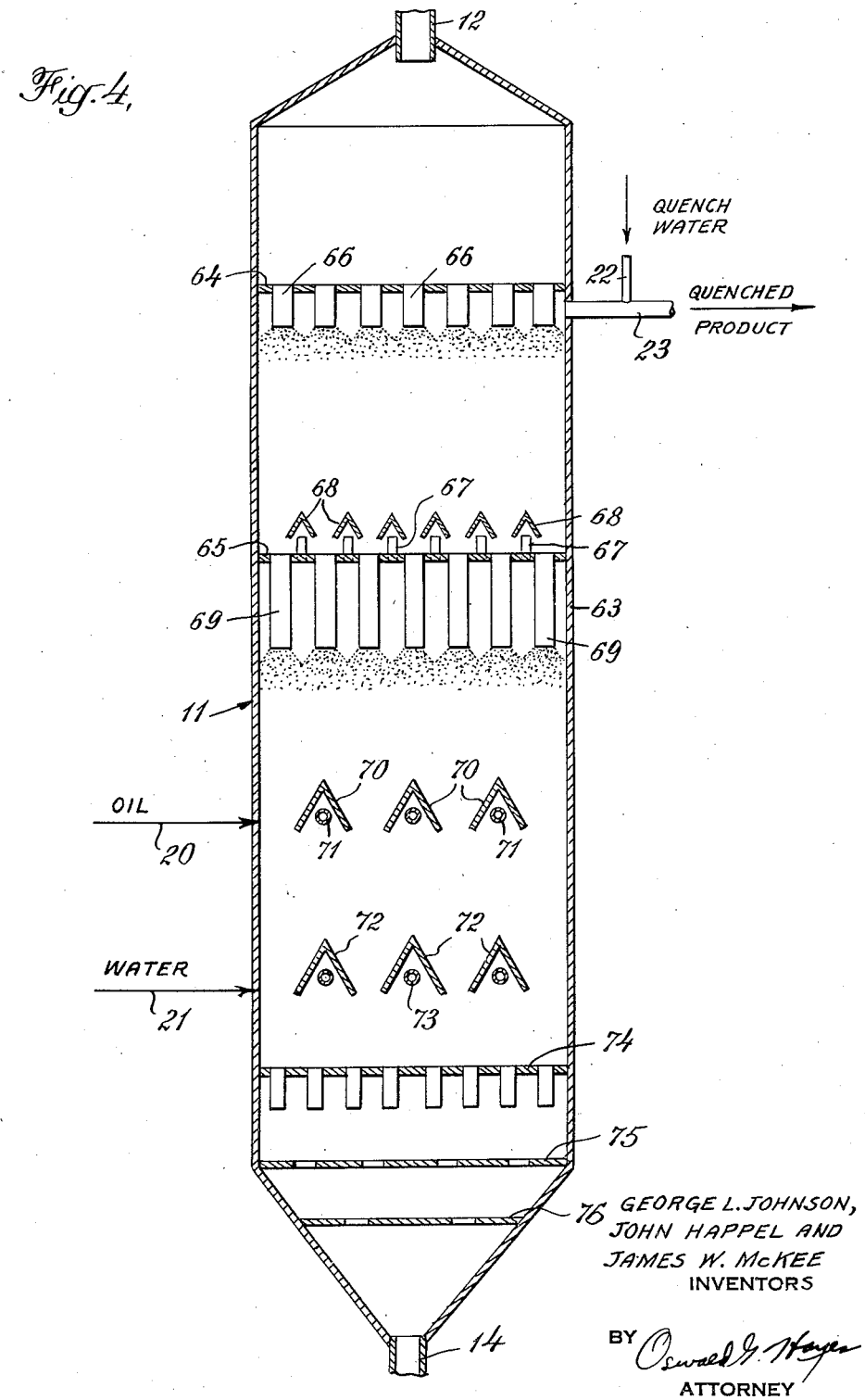

Patented Apr. 4, 1950

2,503,202

UNITED STATES PATENT OFFICE 2,503,202

CONTACTING APPARATUS

George L. Johnson, New York, John Happel, Brooklyn, and James W. McKee, New York, N. Y., assignors to Socony-Vacuum Oil Company, Incorporated, a corporation of New York Application March 27, 1946, Serial No. 657,593

3 Claims. (Cl. 23—284)

This invention relates to apparatus for the thermal cracking of hydrocarbons by contacting with a highly heated solid material. The apparatus of this invention is also useful for gas and solid contacting operations in general.

High yields of valuable unsaturated materials can be obtained by cracking hydrocarbons at high temperatures for relatively short periods of time. For example, high yields of ethylene are obtained by cracking crude oils and fractions thereof at temperatures on the order of 1500° F. to 1700° F. for reaction times of less than one second. Short time cracking of such materials as propane, ethane, etc., at temperatures on the order of 2300° F. gives high yields of acetylene. The reaction times must be kept short in order to avoid extensive secondary condensation reactions and the processes are advantageously conducted by passing the reactant fluid in direct contact with a highly heated granular solid to thereby rapidly raise the reactants to reaction temperature.

The present apparatus provides means for preheating, preferably with vaporization from the liquid state, of reactant fluids in contact with granular solids which have been cooled by raising such preheated reactant vapors to the desired reaction temperature. The invention is particularly advantageous in high temperature cracking of hydrocarbons in the presence of steam since it provides means for preheating water and hydrocarbon vapors, mixing the vapors and equalizing pressures thereof followed by introduction of the prepared reaction mixture to a high temperature contacting zone.

Further objects and advantages of the invention will be apparent from the specific forms shown in the annexed drawings, wherein Figure 1 is a flow sheet of apparatus for cracking of gas oil to ethylene in contact with a hot solid;

Figure 2 is a vertical section through the heater shown in Figure 1;

Figure 3 is a horizontal section on line 3—3 of Figure 2; and

Figure 4 is a vertical section through the reactor of Figure 1.

Referring particularly to Figure 1, the scheme shown involves the use of two separate circulating systems for granular solids. The reaction cycle includes a heater 10 for heating granular solids which are then passed to a reactor 11 in which they are contacted with hydrocarbon charge to heat the same to reaction temperature. The feed leg 12 for transfer of solids from heater 10 to reactor 11 is preferably provided with a steam sealing chamber 13 to inhibit transfer of gases between heater 10 and reactor 11. Cooled solids from the bottom of reactor 11 pass through a pipe 14 fitted with a vacuum purging chamber 15 and a valve 16 to the bottom of elevator 17 which conveys the solids to a feed pipe 18 for return to the heater 10. Means may be provided to cool the solids moving to elevator 17 if the outlet temperature of reactor 11 is higher than that which can be tolerated by the elevator. Injection of water by fog nozzles is well adapted to this purpose. If the water be injected at chamber 15, the steam produced is exhausted as indicated. The water may be introduced to solids falling to the buckets at the bottom of the elevator, in which case, the elevator shaft also acts as an exhaust stack. Feed pipe 18 preferably includes a classifier 19 for removal from the system of granular solids of a size smaller than that desired. Oil and water for the reaction are admitted to reactor 10 by lines 20 and 21 wherein they are heated to the desired temperature. If desired, the oil and water charge may be admitted in liquid phase to be vaporized in the lower part of the reactor. Alternatively, vaporization may be accomplished in any suitable manner prior to admission to the reactor. The reaction mixture from the top of reactor 11 is promptly quenched to a reduced temperature, say 1200° F. by water admitted at 22 and is then transferred by line 23 to a solid quench chamber 24 wherein its temperature is further reduced, say to 575° F. and the vapors are then transferred by line 25 through heat exchanger 26 to a vapor separator 27. The final cooling step (heat exchanger 26) may be alternatively conducted by a second liquid quench as water or cold oil. The reaction mixture enters vapor separator 27 at a suitable low temperature such as 100° F. and vapors are taken overhead by line 28 for separation of gaseous products. The liquid phase in separator 27 is transferred to a settling zone (not shown) by line 29 wherein oil and water are separated. The separated water may be used for admission to the reactor at line 21 and as quench water at line 22 since any contaminating deposits in the water so used are laid down on the granular solid and later removed by combustion in heater 10 and air preheater 32. The oil may be recycled in whole or in part to the reactor as desired. Generally best results are obtained by the use of virgin charge but high yields of aromatic by-products can be obtained by recirculation of oil in the system.

Granular solids at elevated temperature leave quencher 24 by feed leg 30 and pass downwardly through the steam sealing chamber 31 to a cooler 32 which preferably also functions to preheat air for use in the burners of heater 10. The cooled granular solid is transferred by pipe 33 through valve 34 and purging chamber 15' to an elevator 35, from the top of which it passes by pipe 36 and classifier 37 to a feed hopper 38. Granular solids from the feed hopper 38 are then transferred by feed leg 39 through steam sealing chamber 40 to the quencher.

Air for cooling granular solids in cooler 32 is supplied by blower 41 and heated air is withdrawn from the cooler by pipe 42 and transferred to the heater wherein it is used to burn fuel supplied by line 43. A system of this general type wherein the air from the cooler is supplied to the heater is described and claimed in United States Patent 2,444,650 issued April 4, 1946.

The details and operation of the heater are seen by reference to Figures 2 and 3. Essentially, the heater comprises a shell 44 having two tube sheets 45 and 46 dividing the same into an upper preheating zone, an intermediate combustion and high temperature heating zone and a lower combustion and high temperature heating zone. The preheating zone is essentially set up to operate as two successive preheating sections but flow of gases between the two sections is not efficiently inhibited as is flow between the preheating and intermediate high temperature zone and between the two high temperature zones.

In each of the high temperature zones a number of feed pipes 47 depend from the tube sheet to provide paths of restricted cross-section for passage of the granular solids. This largely inhibits upward flow of gases and causes equal distribution of flowing solids across the heater. The feed tubes 47 also provide an open space below the tube sheet in which are installed air feed headers 48 and fuel headers 49. Air and fuel from the headers are supplied to burners 50 which may be no more than concentric pipes as shown. The burners 50 provide a flame which is preferably directed onto the surface of the granular solids lying at an angle below the open lower end of feed tubes 47. Combustion is very efficient because of the catalytic effect of solid surfaces and high temperature products of combustion are generated in direct contact with the granular solids. The products of combustion in the first high temperature zone are removed by the gas collector 51 and transferred by line 52 to a gas distributor 53 in the preheating zone. Similarly, the products of combustion in the lower high temperature zone are removed by collector 54 and transferred by line 55 to distributor 56. Gas collectors 57 and 58 in the preheating zone induce countercurrent flow of the hot products of combustion in the upper preheating zone and the flue gases are transferred from the collectors 57 and 58 to a stack or economizer by line 59. It is preferred that the preheating zone be spaced a considerable distance from inlet pipe 18 at the top of the heater in order to provide a bulk supply of solids in the top of the heater and also to inhibit flow of gases upwardly to pipe 18 by the depth of solids in the top. Uniform flow in the bottom of the heater is induced by a plurality of flow plates 60, 61 and 62 having orifices spaced in substantially the manner shown. The heater described hereinabove and shown in Figures 2 and 3 is described and claimed in application Serial Number 657,592 filed in the United States Patent Office on March 27, 1946.

As shown in Figure 4, the reactor 11 is enclosed by a shell 63 which is equipped with tube sheet 64 and 65. The space above the upper tube sheet 64 serves as a supply hopper from which high temperature granular solids are fed into a high temperature contacting zone by feed tubes 66 depending from the tube sheet 64. This provides a vapor sealing zone which inhibits the loss of gases upwardly from the reactor and the open space about the tubes 66 serves as a collection chamber from which vapors may be removed by pipe 23 and quenched with water by pipe 22 as noted above in connection with Figure 1.

As the granular solids move downwardly from tubes 66 they rapidly heat reaction vapor to the desired reaction temperature and are themselves cooled, reaching tube sheet 65 at a substantially reduced temperature, say 1000° F. Vapors from the lower preheating zone are transferred through the tube sheet 65 by pipes 67 to inverted angles 68 which serve as vapor distributors. The granular solids enter feed tubes 69 which function in the same manner as tubes 66 to provide a gas disengaging space in the nature of a plenum chamber. In this region preheated oil and water vapors from the lower part of the reactor are thoroughly mixed and equalized as to pressure for feeding into the upper high temperature reaction zone. In an intermediate portion of the preheating zone are a plurality of inverted troughs 70 which serve to distribute fluids supplied by pipes 71. In a typical operation the fluid from pipes 71 may be liquid oil which is vaporized and preheated by contact with the hot solids moving downwardly through the preheating zone. Similar distributors 72 and pipes 73 serve to supply water to the preheating zone in either vapor or liquid phase as desired. The water is preferably introduced as liquid since dirty water can be used in this manner thus avoiding the difficulties of purifying water to be used in conventional steam generators. Apertured flow control plates 74, 75 and 76 in the bottom of reactor 11 function in the same manner as plates 60, 61 and 62 in heater 10. In an operation where liquid oil and liquid water are admitted to the reactor granular solids may be withdrawn from the bottom of the reactor at a temperature on the order of 780° F.

A typical operation involving the temperatures noted above charges Michigan gas oil in liquid phase and dirty water to provide steam amounting to about 50.4% by weight of the amount of gas oil charge. A space velocity of 3.12 volumes of liquid oil at 60° F. per volume of reaction space, i. e. above tube sheet 65, is maintained using a weight ratio of 11.9 parts of granular solids to 1 part of oil in a bed depth of 24 inches. This gives a mean effective temperature of 1440° F. at a contact time of 0.29 second. Among the important products are 28.1% ethylene and 18.3% $C_3$ and $C_4$ olefins. The process also yields 5.5% depentanized motor gasoline having an octane number of 94.6 with 3 cc. of tetraethyl lead. The gasoline is highly aromatic and is also useful as solvents and the like.

We claim:

1. An improved vapor preheater and reactor comprising a vertical vessel having a solid material inlet conduit on its upper end and a solid material outlet conduit on its lower end, a partition across the upper portion of said vessel and a lower partition across said vessel at an intermediate level along its length, said partition dividing said vessel into three superposed chambers, spaced conduits depending from each of said partitions and terminating a spaced distance therebelow, thereby providing confined passages for solid flow between chambers and providing a continuous gas space below each partition and surrounding the conduits depending therefrom, a gas outlet conduit connected into said vessel at a level below the upper partition and above the lower ends of the conduits depending therefrom, a row of spaced, horizontally extending gas distributing troughs, open on bottom, positioned in said vessel shortly above the lower partition and substantially below the lower ends of the conduits depending from the upper partition, a plurality of tubes extending through said lower partition from the gas space therebelow and terminating under said troughs, a second row of horizontally extending distributor troughs within said vessel at a level spaced substantially below the lower ends of said conduits which depend from said lower partition, conduit means for supplying a fluid oil under said troughs, a third row of troughs positioned in the lower portion of said vessel below said last named row of troughs and separate conduit means for supplying water under said troughs.

2. In a reactor for preparing a mixture of preheated vapors and contacting the mixture with a hot granular solid to raise the mixture to reaction temperature; a vertical shell, an inlet for granular solids at the top of said shell, an outlet for granular solids at the bottom of said shell, a tube sheet intermediate the ends of said shell, a plurality of tubes piercing said tube sheet and depending therefrom to form a plenum chamber below said tube sheet among said tubes, fluid distributors in said shell below said plenum chamber, a plurality of spaced hood-like distributing baffles open on bottom positioned within said vessel shortly above said tube sheet, tubes extending through said tube sheet and terminating under said baffles so as to communicate said plenum chamber with the underside of said hood-like baffles, and a gas outlet conduit connected to said shell at a level substantially above said hoodlike baffles.

3. An improved vapor preheater and reactor comprising: a vertical vessel having a solid material inlet conduit at its upper end and a solid material outlet conduit at its lower end, a partition across said vessel at a level intermediate its ends, dividing said vessel into two chambers, spaced conduits depending from said partition and terminating at a level a spaced distance therebelow but substantially above the lower end of said vessel thereby providing a gas space below said partition and among said conduits, a plurality of spaced gas handling collecting hoods, open on bottom, positioned in said vessel above said partition, conduits communicating said gas space below said partitions with the undersides of said hoods, a gas flow conduit opening into said vessel at a level spaced above said hoods, a set of spaced hoods positioned in said vessel a spaced distance below the lower ends of said conduits which depend from said partition, conduit means communicating the undersides of said second named hoods with a location outside of said vessel, a second set of spaced hoods positioned in a lower section of said vessel below said first named set and separate conduit means communicating the underside of said last named hoods with a location outside said vessel.

GEORGE L. JOHNSON.
JOHN HAPPEL.
JAMES W. McKEE.

REFERENCES CITED

The following references are of record in the file of this patent:

UNITED STATES PATENTS

| Number | Name | Date |
|---|---|---|
| 2,386,846 | Dunham | Oct. 16, 1945 |